to any disclaimer, the term of this patent is extended or adjusted under 35 U.S.C. 154(b) by 0 days.

(12) United States Patent  
Millikan

(10) Patent No.: US 8,947,547 B1  
(45) Date of Patent: Feb. 3, 2015

(54) CONTEXT AND CONTENT BASED AUTOMATED IMAGE AND MEDIA SHARING

(75) Inventor: Thomas Nathan Millikan, San Diego, CA (US)

(73) Assignee: Thomas Nathan Millikan, San Diego, CA (US)

( * ) Notice: Subject to any disclaimer, the term of this patent is extended or adjusted under 35 U.S.C. 154(b) by 0 days.

(21) Appl. No.: 13/225,557

(22) Filed: Sep. 6, 2011

Related U.S. Application Data

(60) Provisional application No. 61/381,986, filed on Sep. 12, 2010.

(51) Int. Cl.
*H04N 5/232* (2006.01)

(52) U.S. Cl.
USPC .................................... 348/211.1; 348/211.8

(58) Field of Classification Search
CPC ................. H04N 5/23206; H04N 2201/0075; H04N 5/4403
USPC .......... 348/211.1, 221.2, 221.3, 221.4, 221.5, 348/221.8, 221.11, 211.2, 211.3, 211.4, 348/211.5, 211.8, 211.11; 705/125
See application file for complete search history.

(56) References Cited

U.S. PATENT DOCUMENTS

| | | |
|---|---|---|
| 5,917,542 A | 6/1999 | Moghadam et al. |
| 6,230,187 B1 | 5/2001 | Suzuki |
| 6,253,023 B1 | 6/2001 | Fukushima et al. |
| 6,642,959 B1 | 11/2003 | Arai |
| 6,715,003 B1 | 3/2004 | Safai |
| 6,832,275 B1 | 12/2004 | Aizawa |
| 7,249,107 B2 | 7/2007 | Yaacovi |
| 7,362,919 B2 | 4/2008 | Das et al. |
| 7,369,164 B2 | 5/2008 | Parulski et al. |
| 7,702,821 B2 | 4/2010 | Feinberg et al. |
| 7,818,811 B2 | 10/2010 | Kirovski et al. |
| 7,870,224 B1 | 1/2011 | Maigatter |
| 7,876,357 B2 | 1/2011 | Jung et al. |
| 7,953,796 B2 | 5/2011 | Brush et al. |
| 8,005,518 B1 * | 8/2011 | Birsel et al. ................ 455/575.1 |
| 8,046,504 B2 | 10/2011 | Feinberg et al. |
| 8,140,813 B2 | 3/2012 | Ozceri et al. |
| 8,150,807 B2 | 4/2012 | Fredlund et al. |
| 8,204,437 B1 | 6/2012 | Rothschild |
| 8,228,367 B2 * | 7/2012 | Johansson et al. .............. 348/43 |
| 8,237,838 B2 | 8/2012 | Watanabe |
| 8,358,358 B2 | 1/2013 | Gallagher et al. |
| 8,437,797 B2 | 5/2013 | Rothschild |
| 8,594,722 B2 | 11/2013 | Rothschild |
| 2002/0051074 A1 | 5/2002 | Kawaoka |
| 2002/0057350 A1 | 5/2002 | Takei |
| 2002/0144148 A1 * | 10/2002 | Hashem et al. ................ 713/201 |
| 2002/0149677 A1 | 10/2002 | Wright |
| 2003/0004916 A1 | 1/2003 | Lewis |
| 2003/0078968 A1 | 4/2003 | Needham et al. |
| 2003/0217118 A1 * | 11/2003 | Kobayashi et al. ........... 709/218 |
| 2003/0234871 A1 * | 12/2003 | Squilla et al. .............. 348/220.1 |
| 2004/0012669 A1 * | 1/2004 | Drell et al. ................. 348/14.08 |
| 2004/0070678 A1 | 4/2004 | Toyama et al. |
| 2004/0109063 A1 | 6/2004 | Kusaka et al. |
| 2004/0141084 A1 | 7/2004 | Kurakata |

(Continued)

*Primary Examiner* — Nhan T Tran
*Assistant Examiner* — Chan Nguyen

(57) ABSTRACT

Digital media can be automatically transferred between a digital capture device or storage device and one or more other devices with little or no user intervention. Media can be selected for automatic transfer based on one or more media-content or media-context characteristics.

18 Claims, 20 Drawing Sheets

(56) References Cited

U.S. PATENT DOCUMENTS

| | | |
|---|---|---|
| 2004/0169730 A1 | 9/2004 | Tamura et al. |
| 2005/0050043 A1* | 3/2005 | Pyhalammi et al. ............... 707/6 |
| 2005/0052685 A1 | 3/2005 | Herf et al. |
| 2005/0246374 A1 | 11/2005 | Blinn et al. |
| 2006/0055825 A1 | 3/2006 | Shiota et al. |
| 2006/0078201 A1 | 4/2006 | Kim et al. |
| 2006/0087559 A1* | 4/2006 | Huberman et al. ........ 348/207.1 |
| 2006/0171603 A1 | 8/2006 | Jung et al. |
| 2006/0174204 A1 | 8/2006 | Jung |
| 2006/0174206 A1 | 8/2006 | Jung et al. |
| 2006/0190618 A1 | 8/2006 | Tomita |
| 2006/0195461 A1* | 8/2006 | Lo et al. ...................... 707/100 |
| 2007/0047950 A1 | 3/2007 | Asami et al. |
| 2007/0061409 A1* | 3/2007 | Rydenhag ................... 709/217 |
| 2007/0136608 A1 | 6/2007 | Kirovski et al. |
| 2007/0161402 A1 | 7/2007 | Ng et al. |
| 2007/0188626 A1* | 8/2007 | Squilla et al. .............. 348/222.1 |
| 2008/0009272 A1 | 1/2008 | Toledano |
| 2008/0010255 A1 | 1/2008 | Lee et al. |
| 2008/0133526 A1* | 6/2008 | Haitani et al. .................... 707/7 |
| 2008/0133697 A1* | 6/2008 | Stewart et al. ................ 709/217 |
| 2008/0174676 A1 | 7/2008 | Squilla et al. |
| 2008/0222655 A1 | 9/2008 | Sato |
| 2008/0227431 A1* | 9/2008 | Kondo et al. ................. 455/406 |
| 2009/0027505 A1 | 1/2009 | Jung et al. |
| 2009/0073268 A1* | 3/2009 | Jung et al. ................. 348/207.1 |
| 2009/0091637 A1* | 4/2009 | Suzuki ....................... 348/222.1 |
| 2009/0115852 A1 | 5/2009 | Jung et al. |
| 2009/0144392 A1 | 6/2009 | Wang et al. |
| 2009/0161962 A1 | 6/2009 | Gallagher et al. |
| 2009/0172560 A1* | 7/2009 | Cole et al. ..................... 715/744 |
| 2010/0002122 A1* | 1/2010 | Larson et al. ............. 348/333.01 |
| 2010/0042648 A1 | 2/2010 | Cannon et al. |
| 2010/0079594 A1* | 4/2010 | Voglewede et al. ........... 348/155 |
| 2010/0182437 A1 | 7/2010 | Shin et al. |
| 2010/0182439 A1* | 7/2010 | Morita ..................... 348/207.11 |
| 2010/0194900 A1 | 8/2010 | Watanabe |
| 2010/0222107 A1* | 9/2010 | Wassingbo .................... 455/566 |
| 2010/0271490 A1* | 10/2010 | Jung et al. .................. 348/207.1 |
| 2011/0083101 A1 | 4/2011 | Sharon et al. |
| 2011/0191438 A1 | 8/2011 | Huibers et al. |
| 2011/0191823 A1 | 8/2011 | Huibers |
| 2012/0162474 A1 | 6/2012 | Sukegawa |

* cited by examiner

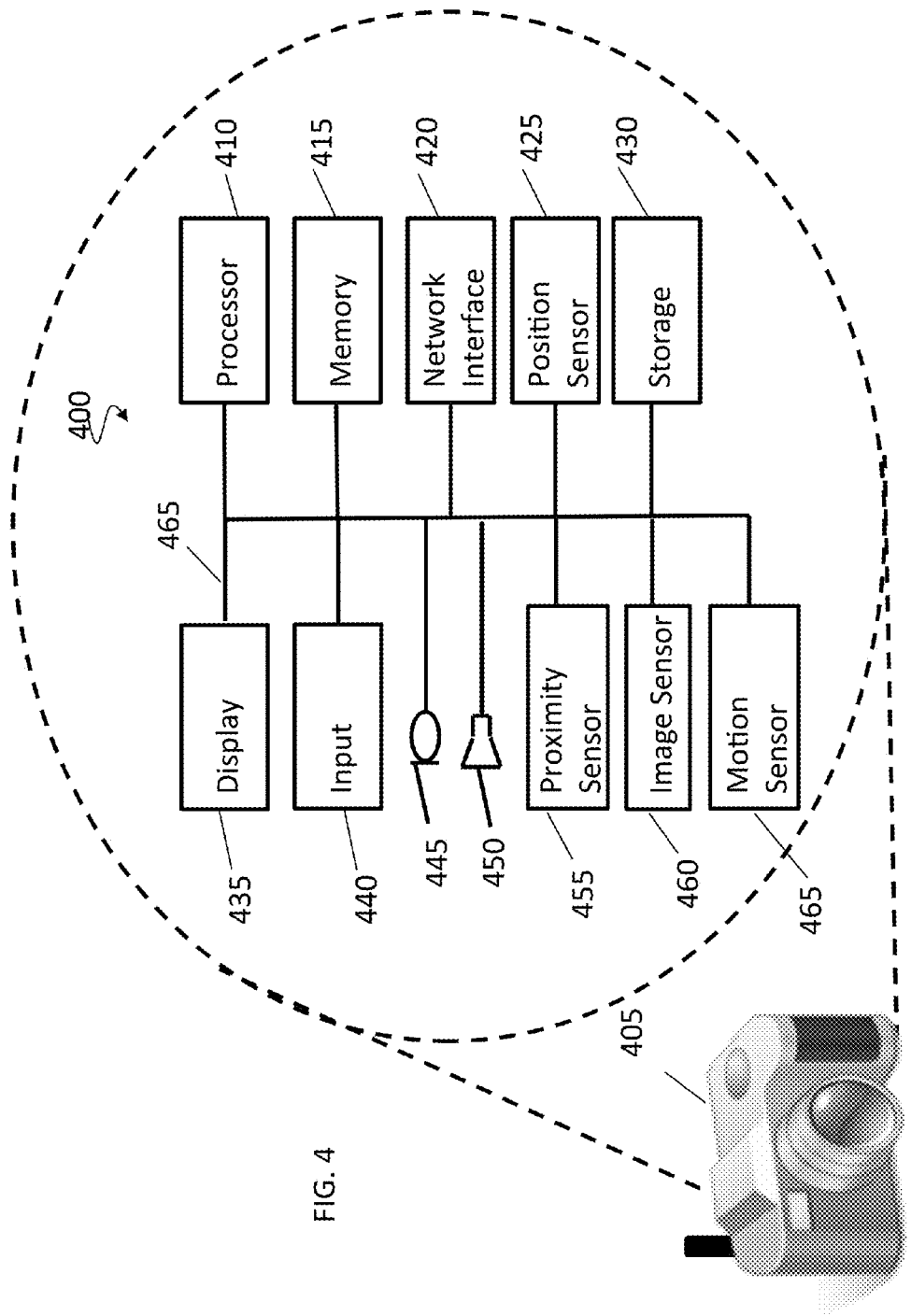

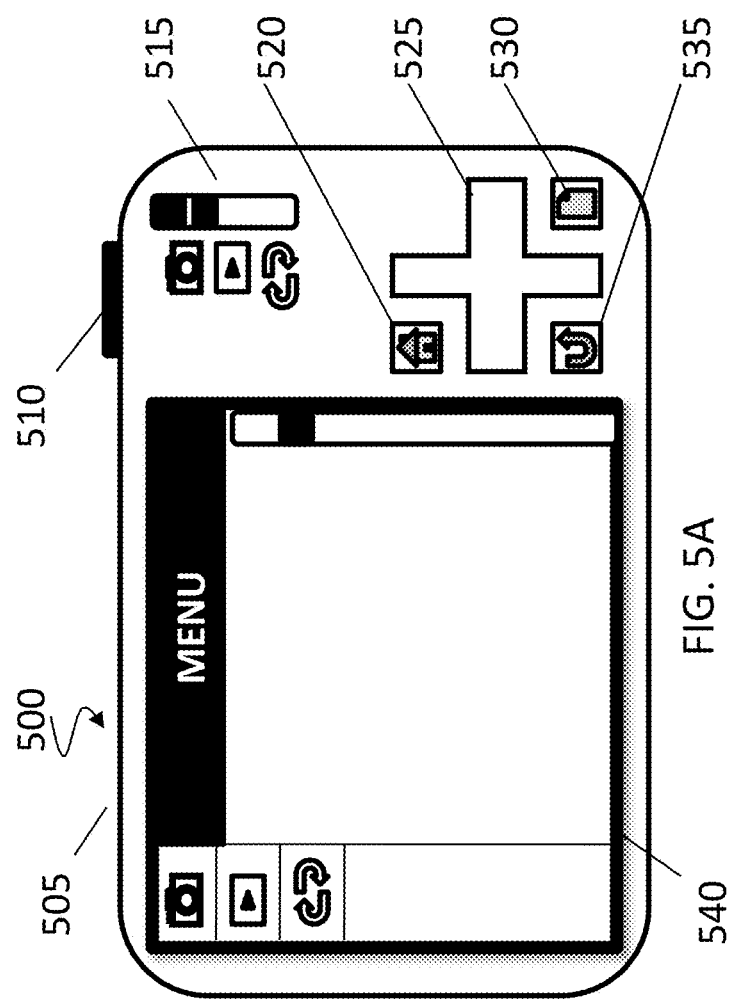

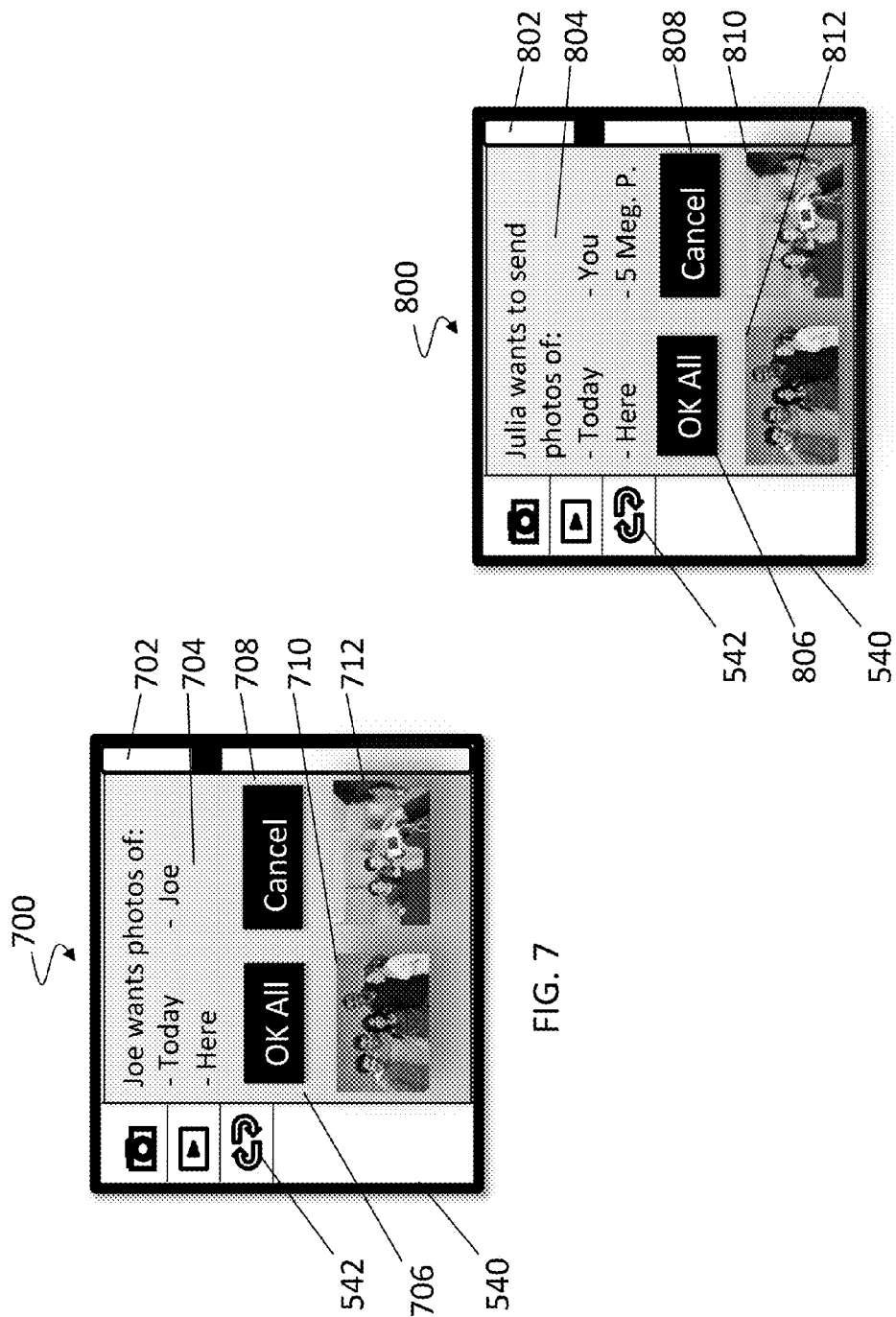

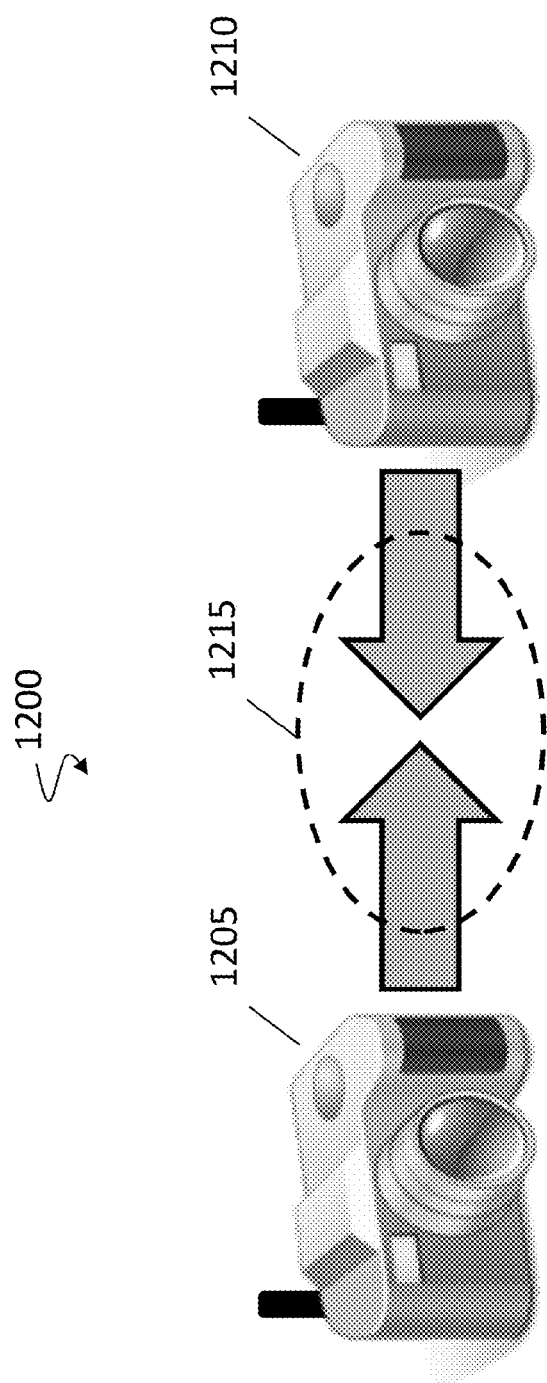

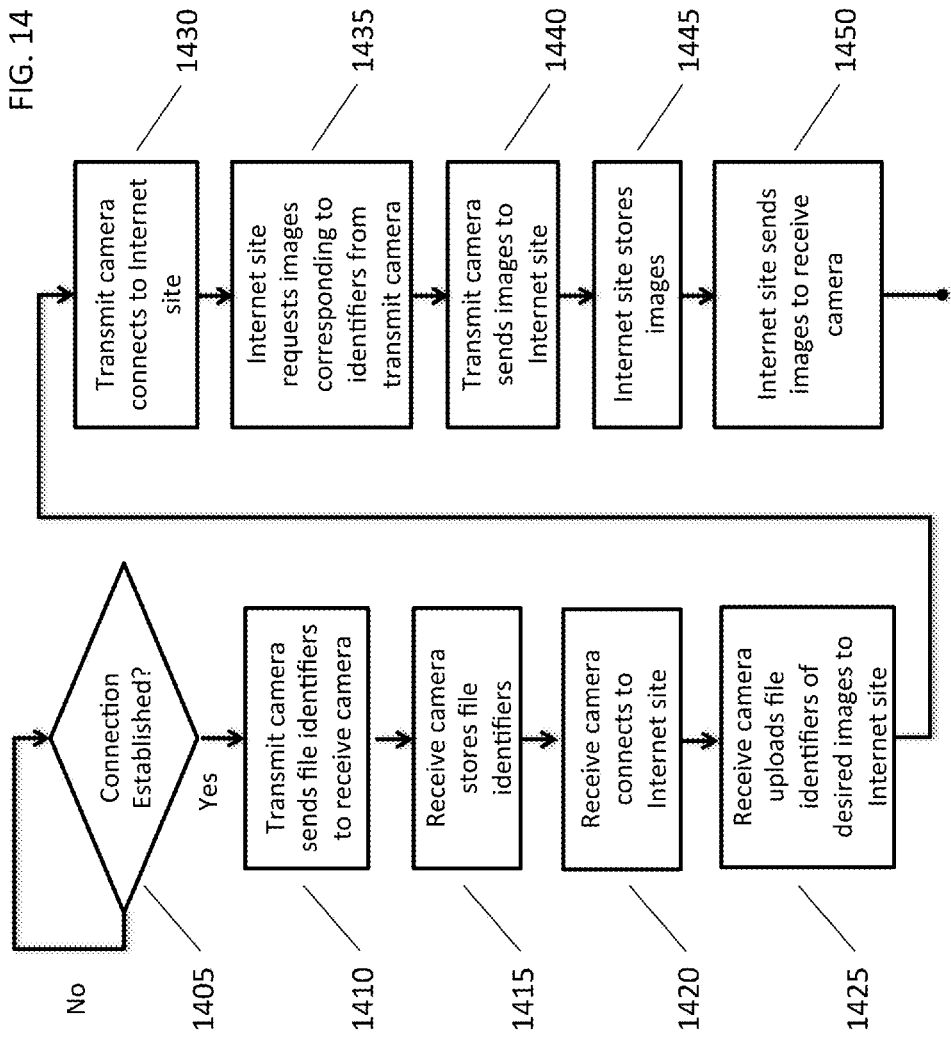

US 8,947,547 B1

CONTEXT AND CONTENT BASED AUTOMATED IMAGE AND MEDIA SHARING

PRIORITY

This application claims priority to U.S. Provisional Application 61/381,986, filed on Sep. 12, 2010, entitled "Context and Content Based Automated Image and Media Sharing," which is incorporated herein in its entirety.

TECHNICAL FIELD

The present disclosure relates to digital images and videos, and to systems and methods for providing automated exchange of digital images and videos between image capture and/or image storage devices.

BACKGROUND

The use of digital images and videography has drastically increased over the last decade. Most people own one or more digital image or capture devices, e.g. a digital camera or camcorder. Almost every mobile phone includes an integrated digital camera. Many of the digital cameras in mobile phones also are capable of capturing high quality video. In short, everyone from teenagers to grandparents have at least one digital image capture device. The portability of digital cameras along with ever increasing storage capacity, has allowed users to amass large collections of digital images and videos.

Not all digital image and video formats are interchangeable. While JPEG has become a default standard for amateur digital images, professional photographers use RAW formats such as NEF for Nikon cameras, RC2 for Canon cameras, SRF for Sony cameras. Similarly, digital videos are captured in a variety of formats, including MOV for Apple files, MP2 for MPEG-2 files, MP4 for MPEG-4 files, WMV for Windows Media files, 3GP for mobile phones, or SVI for Samsung files.

The quality of lenses, image sensors, control systems, and in-camera processing vary greatly between devices. Accordingly, image and video quality varies between devices. Two image capture devices can take images of different quality even though they are at the same place at the same time and in the same environmental conditions.

Further, the nature of digital images and digital video permit a wide range of analysis and post processing. Devices can analyze an image or video and perform facial recognition, exposure analysis, white balance analyses, image stabilization, contrast analysis, subject blink analysis, or other quality analysis to determine whether the image or video was captured with the appropriate camera settings. Based on the analysis, it can be determined whether post processing could improve the image. Numerous types of post processing exist. A device can be configured to perform contrast enhancement, local contrast enhancement (i.e. digital lighting), brightness enhancement, color enhancement, color conversion, red-eye reduction, digital lighting, sharpness, straightening, noise reduction, and landscaping compiling. These analysis and post-processing techniques can be performed automatically or based on user-input, and can be used to improve the quality of captured images and video sequences.

Modern image and video formats also allow for a significant amount of context information to be stored in metadata and associated with digital images and video. Metadata can include any of the image dimensions, device maker, device model, color space, profile used, focal length, exposure time, f-stop, ISO speed rating, aperture value, flash mode, flash energy, 35 mm focal length, creation date and time, GPS coordinates, and facial recognition data. This data is sometimes referred to as EXIFF data, based on the EXIFF standard. Some of this metadata can be used with the analysis and post-processing techniques to perform image enhancement. For example, the exposure and lens settings can be used to modify the exposure settings used during processing. Other types of metadata can be used to organize images or provide context. For example, the date taken information can be used to create a timeline graph. Also, the GPS data can be used to show the location where the image was taken.

Facebook, image-sharing, or image-printing websites can be used to share images between users. But these methods do not provide the high-quality originals to the recipients. A memory card from a digital camera can be shared and the images on that memory card can be copied onto other memory cards, but this typically requires the use of a full-sized computer. Images can also be emailed from one device to another, but this requires post-event follow-up, which reduces the likelihood it will happen. Further, email providers often limit the size of emails, which forces the sender to send multiple emails or shrink the size of each image and thus reduce the quality.

SUMMARY

The present inventor recognized the need to simply and efficiently identify relevant media for exchange and to simply and efficiently exchange images and other media between devices. Further, the present inventor recognized the need to immediately share images and other media shortly after capture, so that multiple users need not try to capture the same image using multiple devices or remember to share an image at a later time.

In general, in one aspect, the techniques can be implemented to include an image sensor capable of capturing an image; a display capable of displaying the captured image; a processor configured to process the captured image and further configured to identify the captured image as corresponding to a send profile; and a transmitter configured to transmit the captured image. Further, the techniques can be implemented such that the transmitter comprises a transceiver adapted to receive image data. Further, the techniques can be implemented such that the transmitter comprises a transceiver adapted to receive a receive profile. Further, the techniques can be implemented such that the processor is further configured to generate a unique identifier for the captured image. Further, the techniques can be implemented such that the send profile includes a resolution threshold. Further, the techniques can be implemented such that the send profile includes a location filter. Further, the techniques can be implemented such that the send profile includes a temporal filter. Further, the techniques can be implemented such that the send profile includes face data.

In general, in another aspect, the techniques can be implemented to include a digital storage adapted to store captured images; a processor configured to select an image from the one or more stored images in accordance with a profile; and a transmitter adapted to transmit the selected image to a receiving device associated with the profile. Further, the techniques can be implemented such that the profile includes an identification criterion corresponding to image content. Further, the techniques can be implemented such that the profile includes an identification criterion corresponding to imagine context. Further, the techniques can be implemented such that the transmitter is configured to make a peer-to-peer connection.

Further, the techniques can be implemented such that the transmitter is further configured to transmit a send profile. Further, the techniques can be implemented such that the transmitter comprises a transceiver configured to receive an image from an image capture device. Additionally, the techniques can be implemented to include a proximity sensor for sensing the proximity of another image capture device.

In general, in another aspect, the techniques can be implemented to include an image sensor capable of capturing an image; a digital storage capable of persistently storing the captured image; a processor configured to format the captured image and to identify a match between the captured image and a send profile; and a transmitter configured to transmit the identified captured image to a receiving device. Further, the techniques can be implemented such that the apparatus is configured to automatically transmit the identified captured image in response to the identifying. Further, the techniques can be implemented such that the send profile includes one or more location criteria and one or more temporal criteria. Further, the techniques can be implemented such that the send profile includes one or more items of facial recognition data. Further, the techniques can be implemented such that the transmitter is further configured to transmit the send profile to another image capture device.

Various implementations of the subject matter described herein may provide one or more of the following advantages. In one or more implementations, the techniques and apparatus described herein can instantaneously share images and media upon capture. Additionally, in one or more implementations, the techniques and apparatus described herein can identify the relevant images to share based on media-context or media-content information, including the sharing of images and media that were captured at the same time and place when another person was present or that match a face in a sample image. Accordingly, in one or more implementations, the techniques and apparatus described herein can implement the exchange of images and other media that simply the identification of relevant images and allow for automated and immediate exchange of images or other media.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 4 shows a block diagram of an automated sharing system.
FIGS. 5A-5D show an initial automated transmission settings of an image capture device.
FIG. 7 shows a transmission screen prompt.
FIG. 8 shows a receive screen prompt.
FIG. 12 shows an automated sharing event initiated by acute proximity.
FIG. 14 shows steps for automatically sharing images using the Internet.

Like reference symbols indicate like elements throughout the specification and drawings.

DETAILED DESCRIPTION

Figure 1:
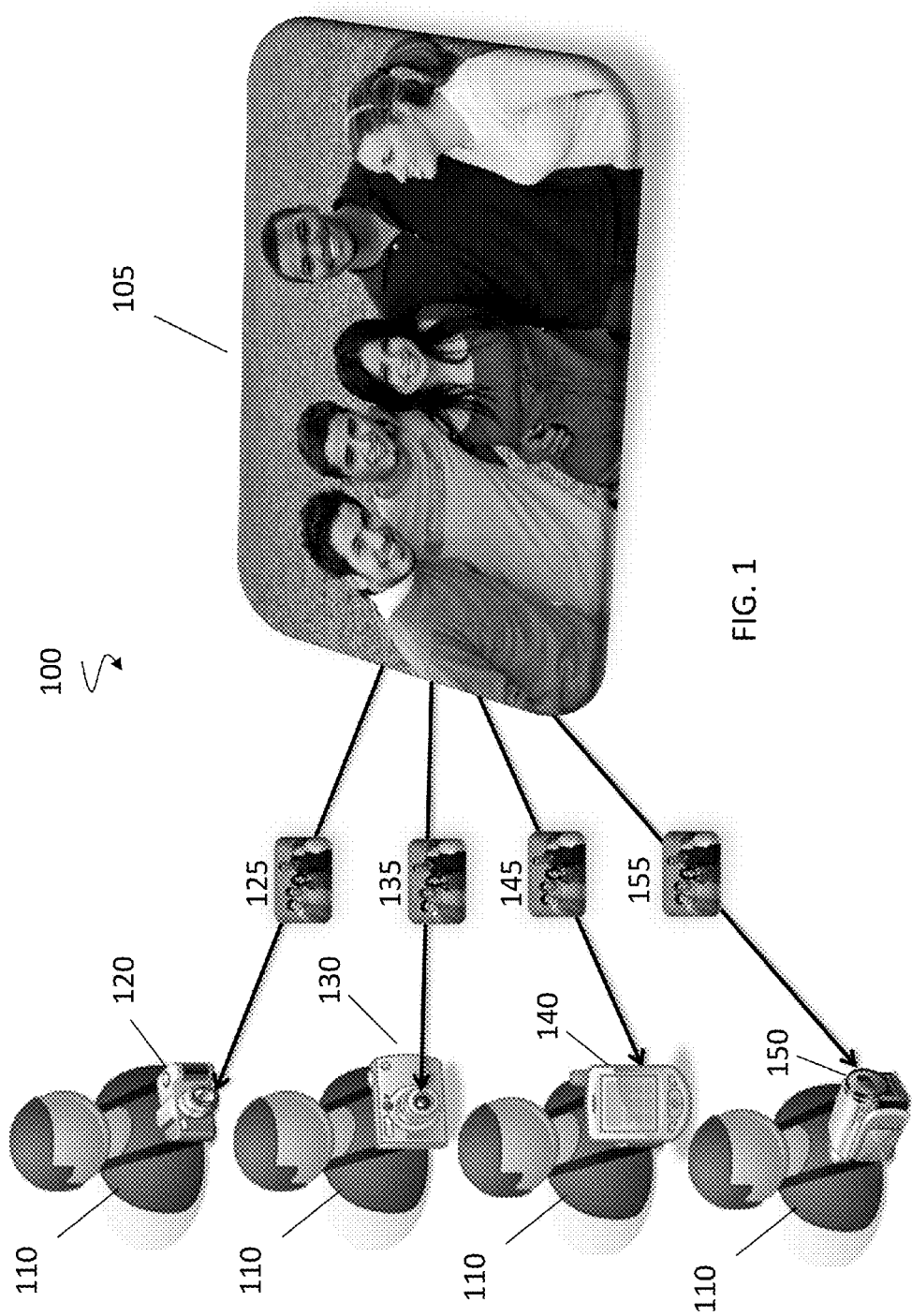
FIG. 1 shows multiple digital image capture devices capturing images of the same scene.

It is common for multiple cameras to be used to take images of the same exact scene at the exact same time. FIG. 1 shows multiple digital image capture devices capturing images of the same scene. Group of friends 105 gathers to take an image. They ask passerby 110 to take the image. Because each person in group of friends 105 wants to have the image on their device, each person asks passerby 110 to capture the image with their camera. Thus, passerby 110 uses camera 120, 130, 140, and 150 to capture images 135, 145, 155, respectively. Cameras 120, 130, 140, and 150 each can have different characteristics, including different lens type, image sensor, control system and in-camera processing. Further, because the scene was captured at different instances in time, the subjects can have changed, e.g., by moving, blinking, etc. Thus, passerby 110 captured numerous images of the same scene when one might have sufficed, and the quality of the image each of the group of friends received can have varied.

Figure 2:
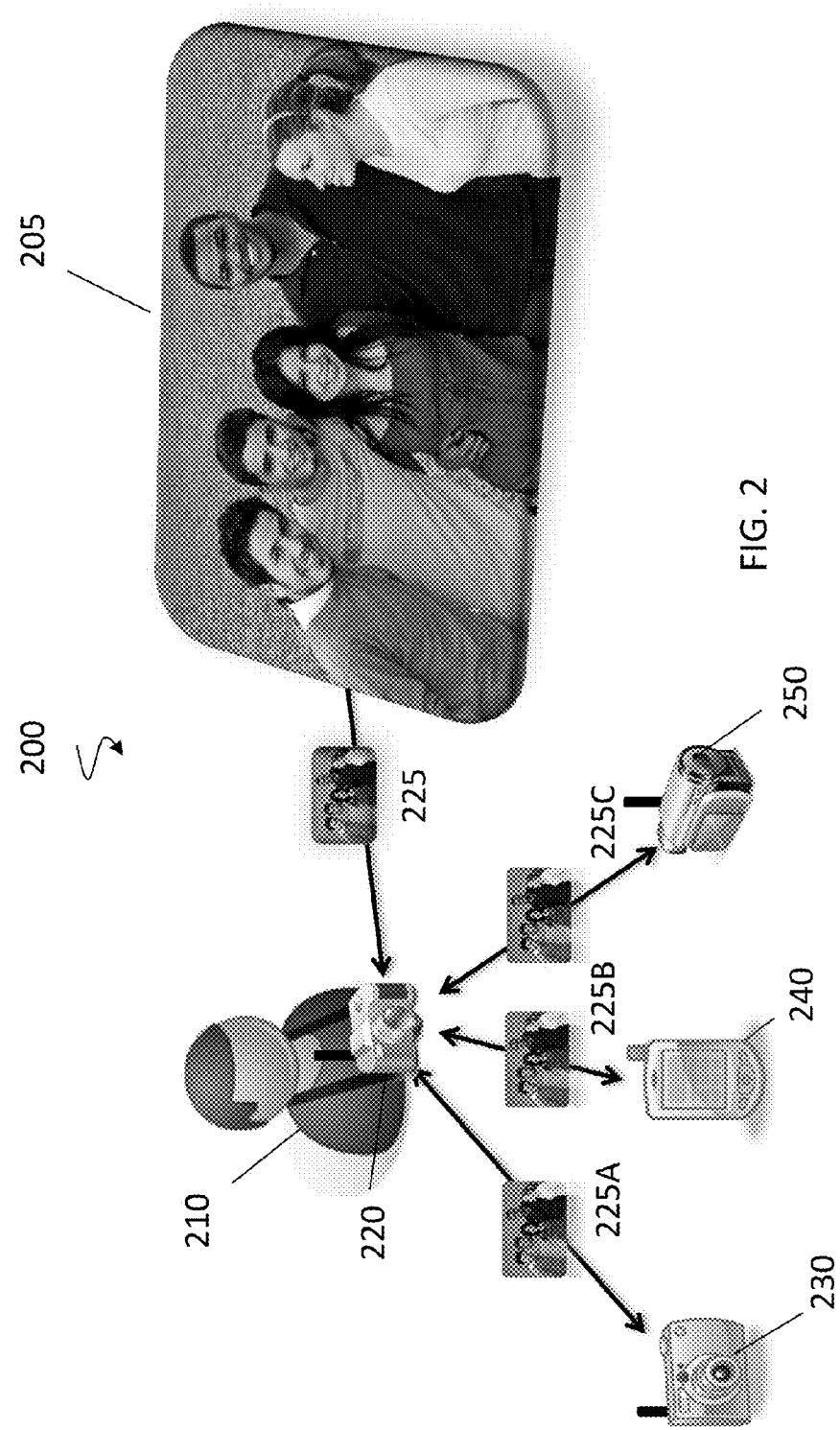
FIG. 2 shows image sharing between image capture devices.

FIG. 2 shows image sharing between image capture devices. Group of friends 205 would like to take an image of them. Passerby 210 uses camera 220 to capture image 225 of group of friends 205. In some implementations, camera 220 can be used to capture multiple images. For purposes of the present description, multiple images can be treated in the same manner as a single image. Further, image 225 can be duplicated. Camera 220 can be configured with a radio to transmit one or more images 225A-C to other image capture devices, such as to camera 230, PDA 240, and/or camcorder 250. Also, camera 230, PDA 240, and/or camcorder 250 can be configured with a radio to receive the transmitted images 225A-C. In some implementations, other types of media also can be exchanged, including audio or video.

Camera 220 can be configured to determine which images are to be transmitted to one or more other cameras based on the content or metadata associated with images 225A-C. Additionally or alternatively, camera 220 can determine which images are to be transmitted based on information received from camera 230, PDA 240, or camcorder 250. For example, camera 230 can transmit facial recognition data to camera 220, indicating one or more faces for which camera 230 requests to receive matching images.

Camera 230, PDA 240, and/or camcorder 250 can be configured to determine which images to keep based on the content in metadata associated with images 225A-C and/or information received from camera 220. Camera 230, PDA 240, and/or camcorder 250 can select which images to receive based on user input. Also a user can select the individual images to receive or select criteria that identify multiple images. Additionally, camera 220 can be configured to select which images to send based on the content or associated metadata. For instance, a user can select individual images or specify criteria that can be used to determine which images.

Figure 3:
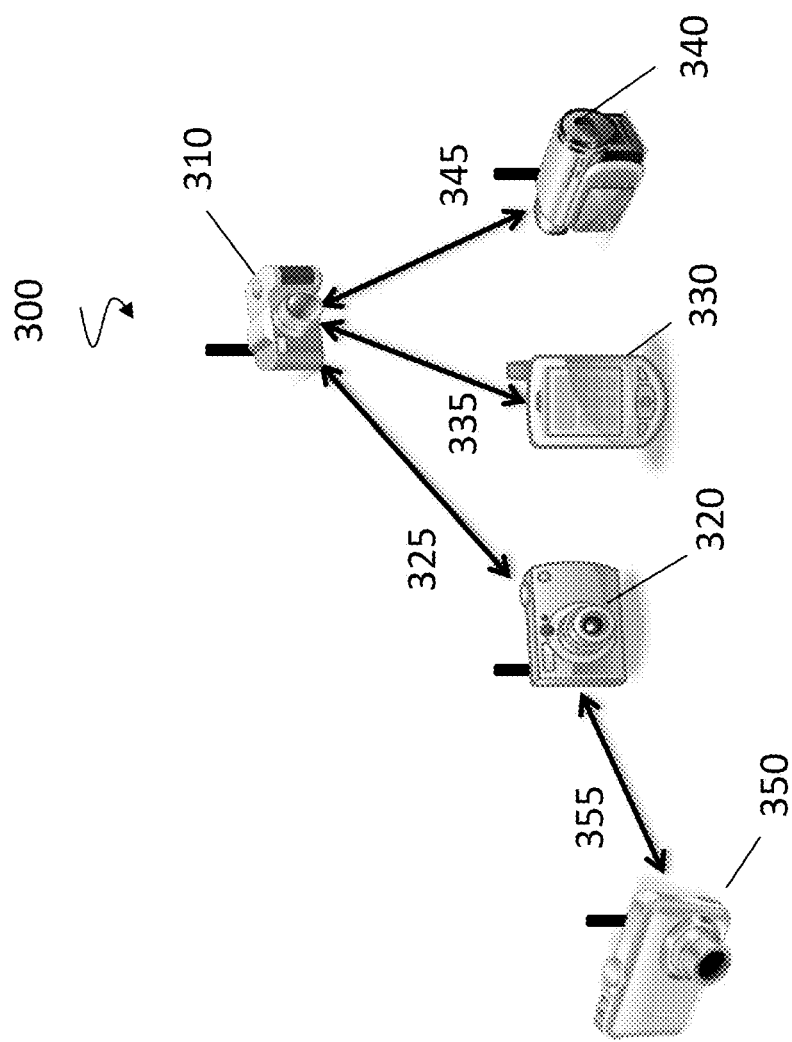
FIG. 3 shows an automated sharing environment.

FIG. 3 shows an automated sharing environment. Sharing environment 300 includes four devices, each having at least one camera, and configured to exchange images. Camera 310 can exchange images with camera 325, PDA 330, and camcorder 340. Each device can include one or more radios configured to communicate with one or more other devices. For example, camera 310 can include multiple radios, such that it can simultaneously communicate with camera 325, PDA 330, and/or camcorder 340. Similarly, camera 320 can include multiple radios so that it can simultaneously communicate with cameras 350 and 310. In some implementations, network broadcast protocols can allow a single radio to simultaneously broadcast information to multiple devices. In some other implementations, the devices can multicast or use peer-to-peer networking for communication. Devices also can use ad-hoc protocols that do not require the existence of networking infrastructure. Further, the radios can use various network protocols, including Bluetooth, Wifi, EVDO, 3G or other wired or wireless radios.

Devices can be capable of detecting other devices and initiating communication. For example, camera 310, while actively searching for other devices capable of sharing, can identify camera 320 as a capable device based on camera 320's response to an inquiry from camera 310. Camera 310 and camera 320 can exchange profiles identifying what images each camera wants to send and receive. Each camera would then identify which images to transmit and then transmit those images.

A device also can transmit or forward an image captured by another device. For example, an image taken by camera 310 can be transmitted to camera 320 and then forwarded to camera 350. In a party environment, this allows images captured by any device to quickly and efficiently be distributed to other devices. To prevent the transmission of an image to a device that already has that image; each image can be uniquely identified. For instance, an image can be named using the serial number of the memory card on which it is first stored and an image number. Likewise the unique identifier can be stored in the metadata of the image. Thus, the unique identifier of an image can be evaluated prior to transmission to confirm that it is not already stored at the receiving camera. In some implementations, other types of media also can be exchanged, including audio or video.

FIG. 4 shows a block diagram of an automated sharing system. FIG. 4 presents a computer system 400 that can be used to implement the techniques described herein for sharing digital media. The computer system 400 can be implemented inside of a camera 405. The computer system 400 can include an image sensor 460 for receiving light and converting it into an image signal. Image sensor 460 can be coupled to bus 465, which can be used to transfer the image signal to one or more additional components. Bus 465 can include one or more physical connections and can permit unidirectional or omnidirectional communication between two or more of the components in the computer system 400. Alternatively, components connected to bus 465 can be connected to computer system 400 through wireless technologies such as Bluetooth, Wifi, or cellular technology. The computer system 400 can include a microphone 445 for receiving sound and converting it to a digital audio signal. The microphone 445 can be coupled to bus 465, which can transfer the audio signal to one or more other components.

The computer system 400 can include a proximity sensor 455 for determining the proximity of computer system 400 to other compatible computer systems. Proximity sensor 455 can use RFID, infrared, Radio Frequency or other known technologies to detect the proximity of other compatible computer systems. Computer system 400 can further include a position sensor 425 for detecting the relative or absolute position of computer system 400. Position sensor 425 can use GPS, assisted-GPS, GSM localization, or similar technologies. Additionally, computer system 400 can include a motion sensor 465, e.g. including one or more gyroscopes, that detects the motion of computer system 400. Motion sensor 465 also can sense when the computer system 400 has stopped moving.

An input 440 including one or more input devices also can be configured to receive instructions and information. For example, in some implementations input 440 can include a number of buttons. In some other implementations input 440 can include one or more of a mouse, a keyboard, a touch pad, a touch screen, a joystick, a cable interface, and any other such input devices known in the art. Further, audio and image signals also can be received by the computer system 400 through the input 440.

Further, computer system 400 can include network interface 420. Network interface 420 can be wired or wireless. A wireless network interface 420 can include one or more radios for making one or more simultaneous communication connections (e.g., wireless, Bluetooth, cellular systems, PCS systems, or satellite communications). A wired network interface 420 can be implemented using an Ethernet adapter or other wired infrastructure. Network interface 420 can be used separately or in conjunction with proximity sensor 455, or in place of proximity sensor 455, to detect the proximity of other compatible computer systems.

An audio signal, image signal, user input, metadata, other input or any portion or combination thereof, can be processed in the computer system 400 using the processor 410. Processor 410 can be used to perform analysis, processing, editing, playback functions, or to combine various signals, including adding metadata to either or both of audio and image signals. For example, processor 410 also can perform facial recognition or insert position information into the image or audio signal. Processor 410 can use memory 415 to aid in the processing of various signals, e.g., by storing intermediate results. Memory 415 can be volatile or non-volatile memory. Either or both of original and processed signals can be stored in memory 415 for processing or stored in storage 430 for persistent storage. Further, storage 430 can be integrated or removable storage such as Secure Digital, Secure Digital High Capacity, Memory Stick, USB memory, compact flash, xD Picture Card, or a hard drive.

The image signals accessible in computer system 400 can be presented on a display device 435, which can be an LCD display, printer, projector, plasma display, or other display device. Display 435 also can display one or more user interfaces such as an input interface. The audio signals available in computer system 400 also can be presented through output 450. Output device 450 can be a speaker or a digital or analog connection for distributing audio, such as a headphone jack. In some implementations, other types of media also can be shared or manipulated, including audio or video.

Figure 5B:
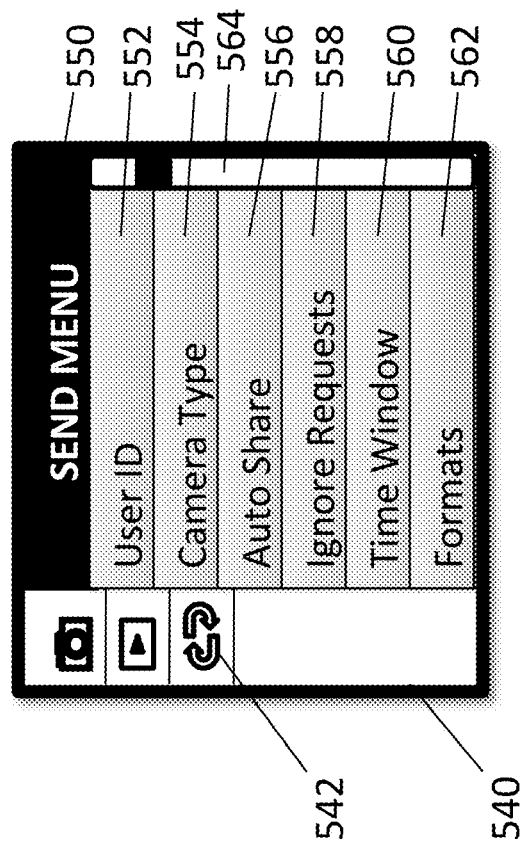
Figure 5C:
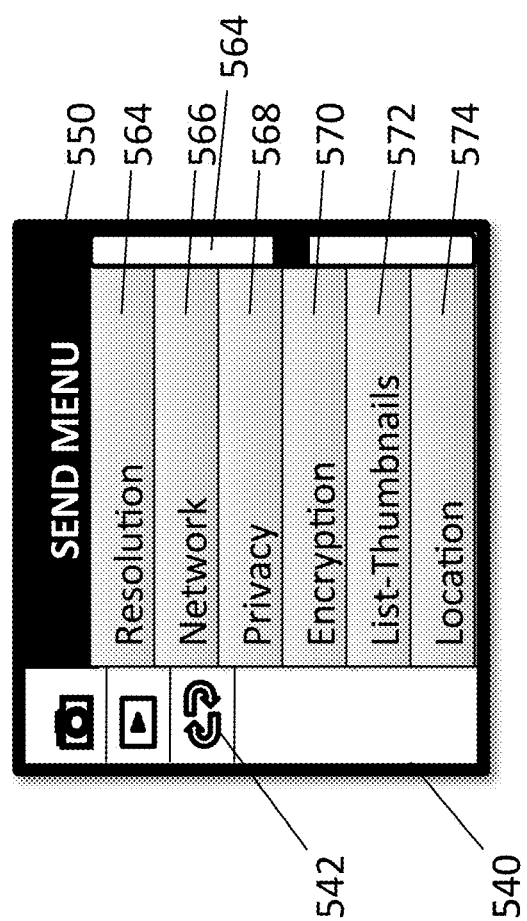
Figure 5D:
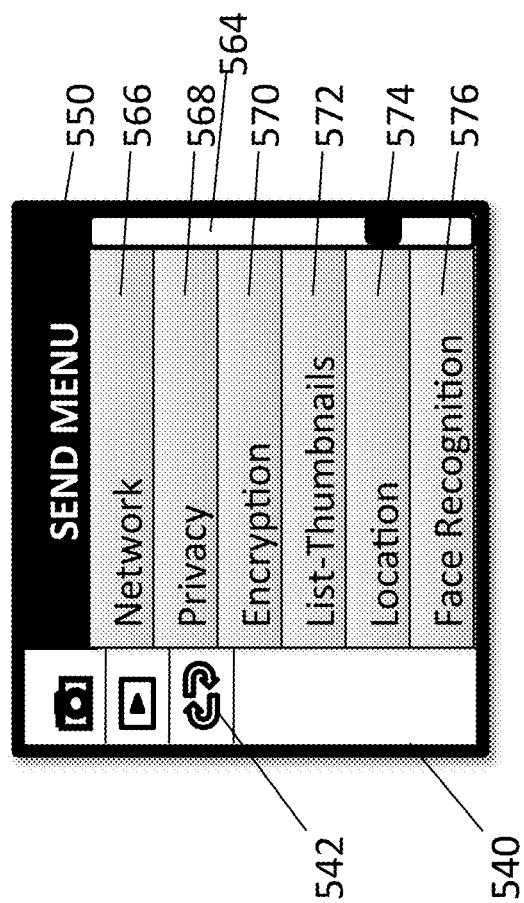

FIGS. 5A-5D show an initial automated transmission settings of an image capture device. FIG. 5A depicts camera 500, including camera body 505. Camera body 505 includes several controls. Shutter button 510 can be activated to capture an image. Switch 515 can be configured to select one of multiple available modes. The modes can include one or more of a mode for capturing images, a mode for reviewing captured images, a mode for setting menu options, or a mode for sharing images. Button 520 can be activated to return menu options or sharing options to a default state. Button 535 can be activated to go backward within a series of menus or options. Button 530 can be activated to delete images or set menus or options. Camera 500 can also include display 540. Display 540 can also be a touch-screen display configured to receive touch input.

FIG. 5B. shows menu options for the image sharing feature displayed on display 540. Icon 542 indicates that the image sharing feature has been selected. Title bar 550 indicates the "SEND MENU" has been selected within the image sharing feature. Scroll bar 564 can indicate the extent of the send menu and can be traversed up or down to reveal different menu options. The set of Send Menu options discussed below, can establish a camera's send profile. Option 552 can be selected to configure a User ID, which can be a unique number assigned by the camera manufacturer, a unique number assigned to the memory card, an email address, a social media user id, a personal name, an image of the camera owner, or other unique identifier. As discussed below, the image can also be used for face-recognition-based image sharing.

Option 554 allows a user to select the types of cameras the user will share with. Option 554 can select a camera type based on any available information, including manufacturers or category (e.g., point-and-shoot, digital single lens reflex camera, electronic viewfinder interchangeable lens, cellphone, etc.). Option 556 allows a user to turn automatic sharing on or off. Automatic sharing allows captured images to be exchanged without additional user intervention based solely on the sharing profile and/or other settings. Option 558 can be enabled to ignore all requests for images and/or ignore requests outside of the camera's send profile.

Option 560 can be configured to specify a particular time frame from which captured images are shared. For example, images captured during a preceding time period, e.g. the last five minutes, one hour, or one day can be identified for sharing. Also, one or more dates can be selected for sharing. Further, a prospective period can be defined for sharing, e.g., the next five minutes, one hour, or day. Option 562 allows a user to select what image format or formats the camera will send. For example, the camera can be set to only send compressed images, such as JPEG, to send RAW images, such as NEF, or both. Option 564 allows the user to select the resolutions that the camera can send. For instance, option 564 can be configured such that the camera send only high resolution or low resolution images. Option 564 also can be configured to resize images captured by the camera or images that are received from other cameras or both.

Option 566 allows the user to select the types of networks used for sharing. For instance, option 566 can be set to use only WiFi, Bluetooth, or cellular network connections. Option 566 also can be set to specify bandwidth or connectivity requirements for the network or network architecture types, such as ad hoc or access point. Option 568 allows a user to select whether one or more items of private information are to be stripped from the metadata before sending. For example, option 568 can be configured to cause the camera to remove sensitive information such as GPS location, timestamps, user IDs, or other such information from images before transmission. Option 570 allows a user to require that an encrypted connection be used for transmitting or that only encrypted files be transmitted. Option 570 also can allow a user to specify the type of encryption.

Option 572 allows a user to identify whether to display the list of images to be sent to a particular camera, e.g., as a list of names or a set of thumbnails. Option 572 also allows the user to adjust the size and layout of the thumbnails. Option 574 allows the user to manage location information. For instance, option 574 can specify whether location information (such as GPS coordinates, compass headings, and/or elevation) is to be embedded in image files or is to be stored separately. Option 574 also can specify whether location information is to be sent to another camera requesting available images. Option 576 allows a user to set one or more face recognition features. Option 576 can set whether face recognition is performed on images accessible to the camera 500. Option 576 also can set whether face recognition information is to be transmitted to other cameras. Option 576 further can control whether the camera 500 performs place recognition based on location information and image content analysis. For example, identifying images as depicting the Statue of Liberty because the image was taken on Elis Island and the image has a greenish color or has heading and elevation data corresponding to the Statue of Liberty. Other options discussed below also can be added to the send menu 550. In some implementations, other types of media also can be shared or manipulated, including audio or video.

Figure 6A:
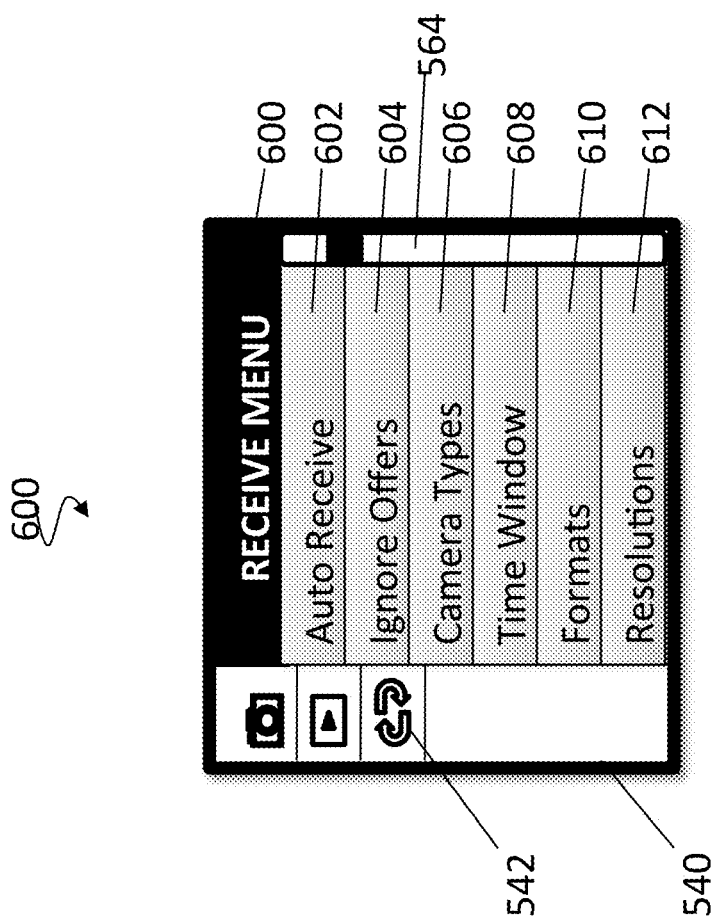
FIGS. 6A-6C show an initial automated reception settings.
Figure 6B:
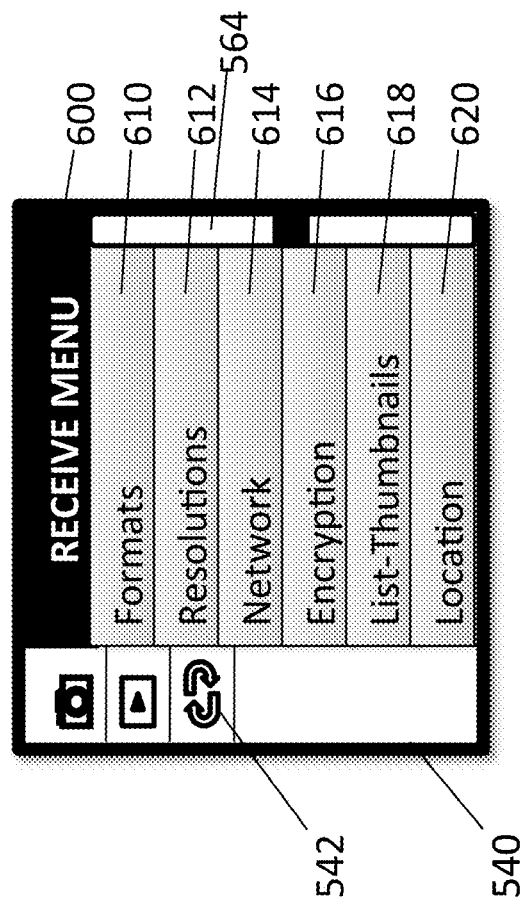
Figure 6C:
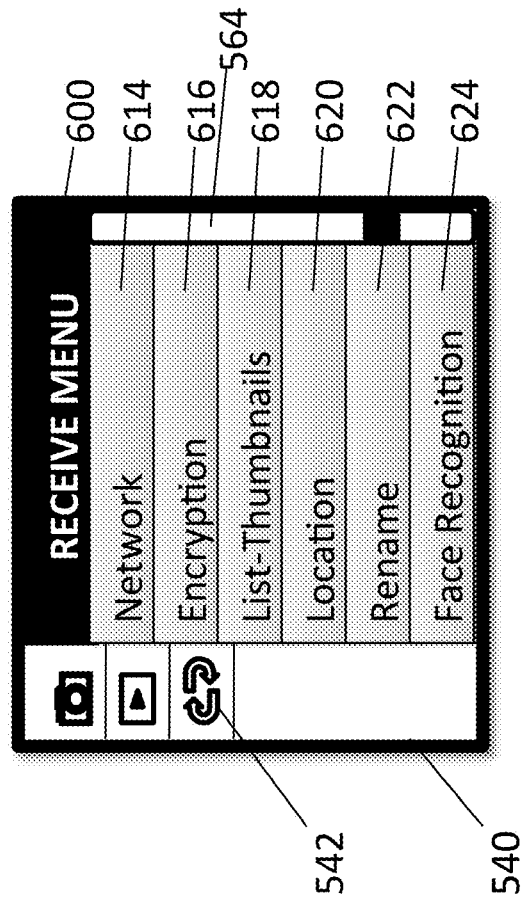

FIGS. 6A-6C show an initial automated reception settings. FIG. 6A. shows menu options for the image sharing feature presented on display 540. Icon 542 indicates that the image sharing feature has been selected. Further, title bar 600 shows the "RECEIVE MENU" has been selected within the image sharing feature. Scroll bar 564 can be moved up or down to reveal different options within the menu. The set of receive menu options discussed below can be used to establish a camera's receive profile.

Option 602 allows automatic sharing to be turned on or off. Automatic sharing allows images to be exchanged without additional user intervention, based solely on the sharing profile and/or one or more other settings. Option 604 configures the camera to ignore all offers to send images from other cameras and/or to ignore offers outside of the camera's profile. Option 606 permits the identification of one or more types of cameras to be shared with. For instance, camera type can be identified based on manufacturer or category (e.g., point-and-shoot, digital single lens reflex camera, electronic viewfinder interchangeable lens, cellphone, etc.).

Option 608 can be used to specify whether images from a particular time frame are to be received. For example, images from the last five minutes, one hour, or one day can be identified for receipt. Alternatively or additionally, one or more dates can be specified and the camera will only receive and store images taken on those dates. Option 610 can be used to specify one or more image formats the camera will receive and store. For example, the camera can be set to receive only compressed images, such as JPEG, or to receive RAW images, such as NEF. Option 612 can be used to specify one or more resolutions that the camera can receive. For instance, option 612 can be set to receive only high resolution images only, low resolution images, or both.

Option 614 allows the type or types of networks used for sharing to be selected. Option 614 can be set to use one or more of WiFi, Bluetooth, or cellular network connections. Option 614 also can be set to specify bandwidth or connectivity requirements for the network or network architecture types, such as ad hoc or access point. Option 616 also can be set to require an encrypted connection or encrypted files be used to transfer the files. Option 616 also can permit specifying the type of encryption to be used.

Option 618 allows identifying how to display the list of images being offered by a particular camera, e.g., as a list or a set of thumbnails. Option 618 also can be used to adjust either or both of the size and layout of the thumbnails. Option 620 permits identifying what, if any, location information is used to identify images to be received. Option 620 can allow any location to be selected, such as the current location, or based on address type information. Option 620 also can permit specification of a radius from a particular location. For example, imagines taken within one mile of the current location. Option 622 can be used to rename incoming files, e.g., using the cameras default naming settings, or using metadata such as location information, camera type information, date taken, username of sender, or other such information.

Option 624 allows one or more face recognition features to be set. Option 624 can specify whether images of only particular people are to be received or stored. Option 624 also can specify whether the receiving camera is to send one or more sample images to the transmitting camera, so the transmitting camera can subject the one or more images to facial recognition processing and compare the images accessible to the transmitting camera for images with similar faces. Based on the processing and comparison, the transmitting camera can then send only images matching that face. Alternatively or additionally, the camera can send face-recognition analytics that can be used by the transmitting camera to identify corresponding images that contain a face matching those analytics. Any identified images can then be transmitted. Option 624 also can control whether camera 500 is to receive images based on place recognition, e.g., implemented as a combination of location information and image content analysis. For example, identifying images of the Statue of Liberty because the image was taken on Elis Island and the image has a greenish color. Other options discussed below can also be added to the receive menu 600. In some implementations, other types of media also can be shared or manipulated, including audio or video.

FIG. 7 shows a transmission screen prompt. The transmission screen prompt 700 appears on display 540 either when another camera requests images and automatic share has been turned on the user's camera, or a request outside of the camera's send profile has been received and ignore requests has been activated. If the user's camera has automatic share turned on and the request falls within the send profile, requested images are automatically sent. Icon 542 shows the image sharing feature is active. Transmission screen prompt 700 can be moved up or down. Scroll bar 702 shows the position of transmission screen prompt 700.

Field 704 displays the request parameters from the requesting camera. For example, the requesting camera can specify images taken today, of a person named Joe, at the present location. Field 704 also can display an image, avatar, user id, or other identifier of the person requesting images. Button 706 can authorize the transmission of all the requested images identified. Button 708 can cancel or deny the request. In some implementations, the request can be partially authorized and partially denied, e.g., by authorizing transmission of a subset of images. Transmission screen prompt 700 also shows the images request by the other camera, including image 710 and image 712. The user can individually select which images to send by viewing these images and identifying them. In some implementations, other types of media also can be shared or manipulated, including audio or video.

FIG. 8 shows a receive screen prompt. The receive screen prompt 800 can appear on display 540 when another camera attempts to transmit images and the user's camera has turned off automatic share. Screen prompt 800 also can appear when automatic share is enabled, but the share request falls outside of the receive profile. If the user's camera has automatic share turned on and the request falls within the receive profile, the images are automatically received and stored. Icon 542 shows the image receiving feature is active. Transmission screen prompt 800 can be moved up or down. Scroll bar 802 shows the position of transmission screen prompt 800.

Field 804 displays the parameters of one or more images another camera would like to send. For example, another camera with a user name of Julia can want to send images taken today, at the present location, of You, that are 5 megapixels or greater. Field 804 could also display an identifier, e.g., an image, avatar, or user id of the person or camera requesting to transmit images. Button 806 allows the user to approve the receipt of the one or more identified images. Button 808 allows the user to cancel or deny the request. Receive screen prompt 800 also can show thumbnails of images to be transmitted by the other camera, including thumbnail 810 and thumbnail 812. The user can individually select one or more images to receive from the thumbnails. In some implementations, other types of media also can be shared or manipulated, including audio or video.

Figure 9:
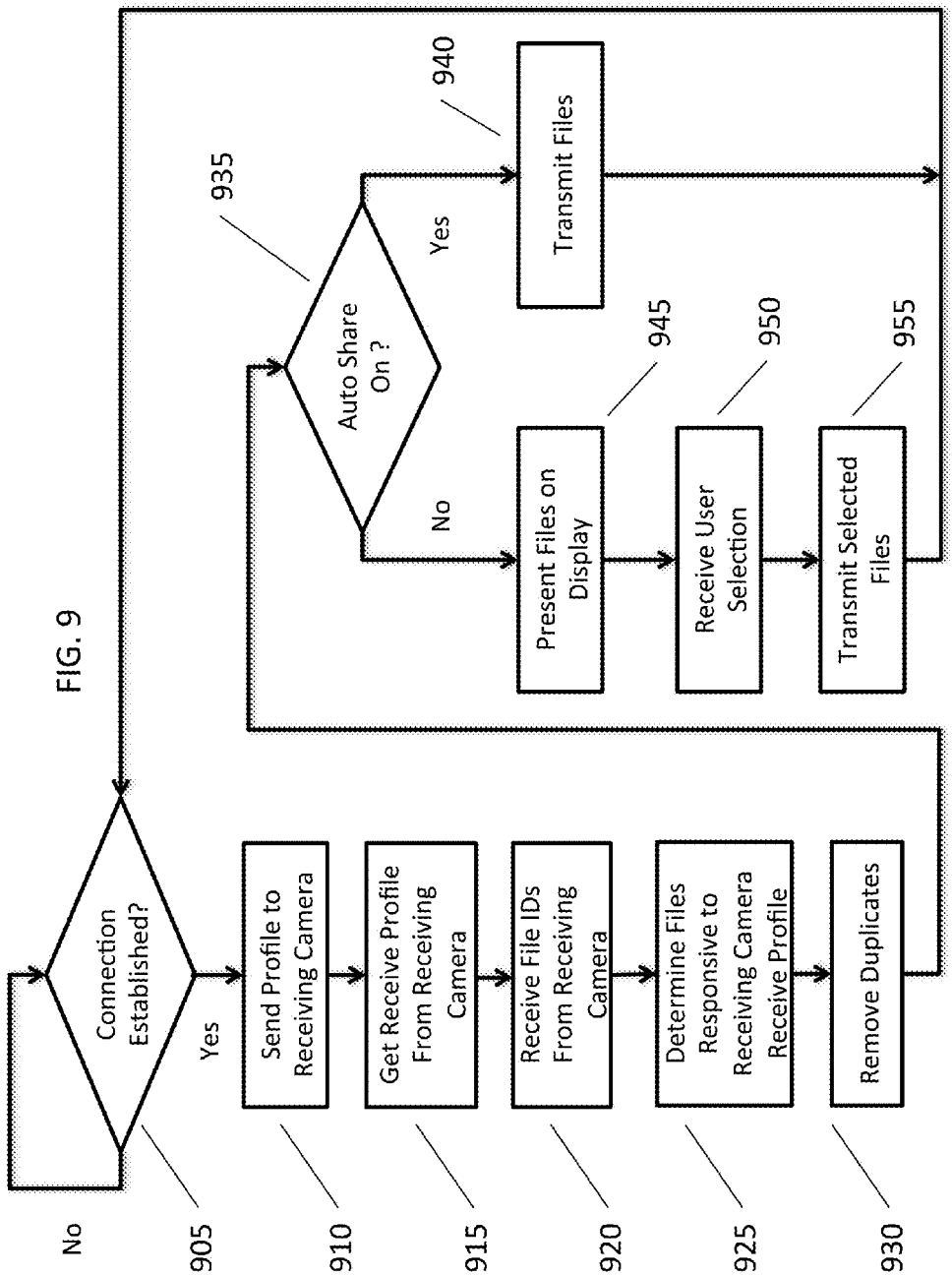
FIG. 9 shows steps for automatically transmitting images.

FIG. 9 shows steps for automatically transmitting images. A camera can monitor a connection status to determine when a connection has been established (905). As long as no connection is established, the camera can continue to monitor the connection status (905). When a transmitting camera wishing to share images establishes a connection, the transmitting camera can transmit its send profile to a receiving camera (910). The transmitting camera can then receive the receiving camera's receive profile (915). Also, the receiving camera can send a list of File IDs that indicate which image, video or media files the receiving camera is storing (920). A File ID can be any identifier, including a concatenation, combination or hash of any or all of a unique ID from a memory card, camera ID, user ID and/or an image identifier. A File ID should uniquely identify a single file. The receiving camera can use the send profile it received (910) to determine which file ids to transmit to the transmitting camera (920).

The transmitting camera can then determine one or more images that are responsive to the receiving camera receive profile (925). For instance, the responsive images can be determined by comparing the receive profile and/or the send profile against the list of available images. The transmitting camera can then use the received file ids to remove any duplicates from the responsive images (930).

The transmitting camera can then determine whether auto share has been enabled (935). If auto share is on, the transmitting camera transmits the files (940). If auto share is off, the files, filed IDs, or file thumbnails can be presented on the transmitting camera's display (945). FIG. 7 illustrates one way to present the files. Upon receiving a user selection (950), the selected files are transmitted (955).

The steps described in FIG. 9 need not be performed in the order recited and two or more steps can be performed in parallel. In some implementations, other types of media also can be shared or manipulated, including audio or video.

Figure 10:
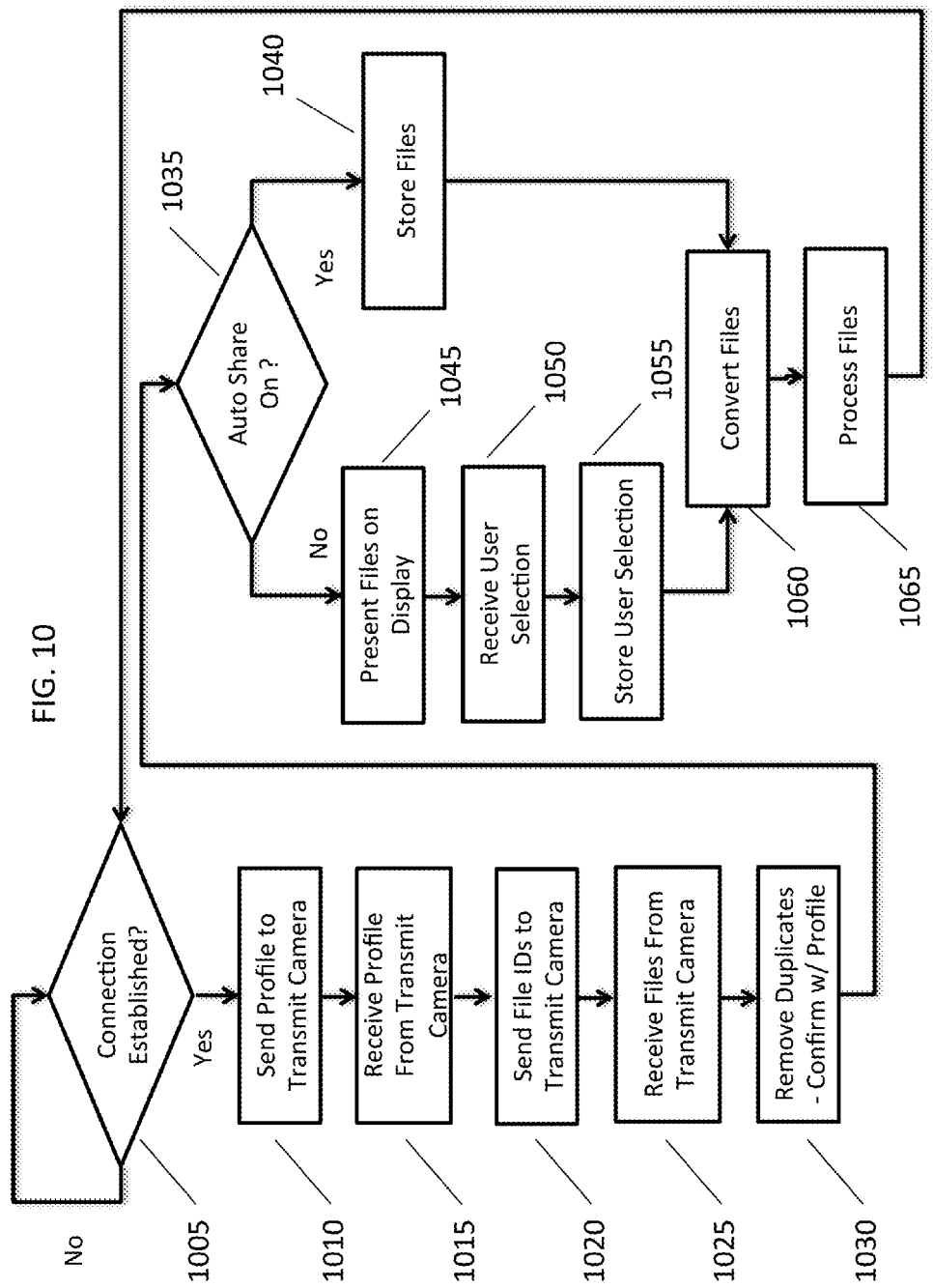
FIG. 10 shows steps for automatically receiving images.

FIG. 10 shows steps for automatically receiving images. A camera can monitor a connection status to determine when a connection has been established (1005). As long as no connection is established, the camera can continue to monitor the connection status (1005). When a receiving camera wishing to receive images establishes a connection, the receiving camera can send it's receive profile to transmitting camera (1010). The receiving camera can receive the transmitting camera's send profile (1015). The receiving camera can also send a list of File IDs that indicate which image, video or media files the receiving camera contains (1020). The receiving camera can use the send profile it received (1010) to determine which file ids to transmit (1020). The camera can then receive the media files from the transmitting camera (1025). The receiving camera can then remove duplicates by comparing files ids, content, or metadata against the files already stored in the camera (1030). The camera can also compare the received files against the receive profile (1030) to ensure the correct files were received.

The receiving camera can then determine whether auto share has been enabled (1035). If auto share is on, the receiving camera stores the files (1040). If auto share is off, the files are presented on the camera's display (1045). FIG. 8 illustrates one way to present the files to the camera's user. Upon receiving the user's selection (1050), the selected files are stored (1055).

The stored files (1040 or 1055) can be converted to a different format (1060). For example, NEF files can be converted to JPG files to save space. The files can be further processed (1060). Processing can including changing the metadata, altering the image, analyzing the image, and/or changing the file name.

The steps described in FIG. 10 need not be performed in the order recited and two or more steps can be performed in parallel. In some implementations, other types of media also can be shared or manipulated, including audio or video.

Figure 11:
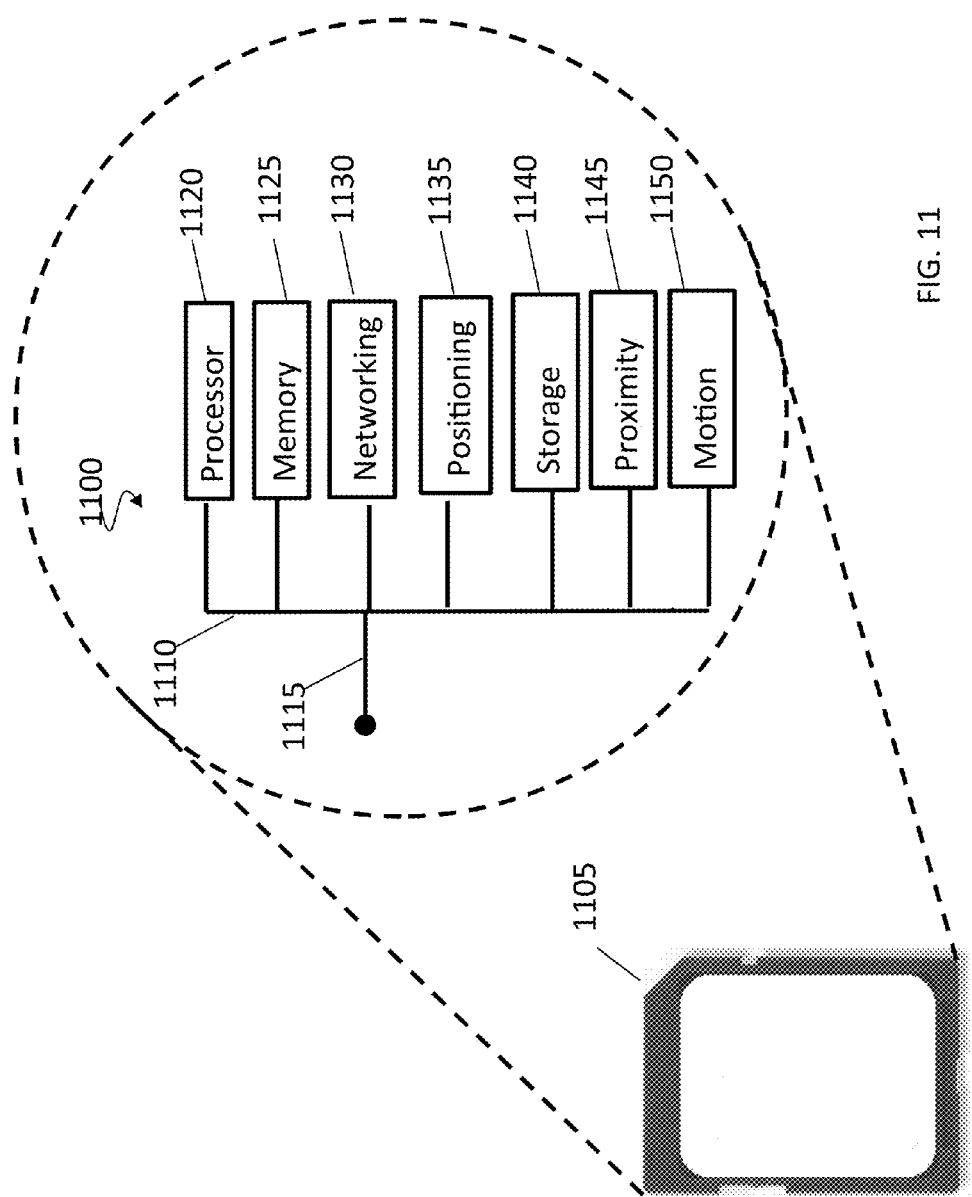
FIG. 11 shows a block diagram of an automated sharing system in a memory card.

FIG. 11 shows a block diagram of an automated sharing system in a memory card. FIG. 11 presents a computer system 1100 that can be used to implement the techniques described above for sharing digital media. The computer system 1100 can be implemented in a memory card 1105. User input can be received at input/output 1115. Input/output 1115 can be connected to a camera or other computer system. Input/output 1115 can be a wired or wireless connection. Input also can include media captured by the camera, e.g., images and video. Input/output 1115 also can be used to send information from memory card 1105 to another device, such as a camera or computer. For example input/output 1115 can send media files, metadata, or memory card status information.

Input/output 1115 can be coupled to bus 1110 that can be used to transfer the image signal to one or more additional components. Bus 1110 can be comprised of one or more physical connections and can permit communication between all of the components in the computer system 1100. Alternatively components connected to bus 1110 can be connected to computer system 1100 through wireless technologies such as Bluetooth, Wifi, or cellular technology.

The computer system 1100 can include a proximity sensor 1140 for determining the proximity of computer system 1100 to one or more compatible computer systems. Proximity sensor 1145 can use RFID, infrared, Radio Frequency or other known technologies to detect the proximity of other compatible computer systems. Computer system 1100 further can include a position sensor 1135 for detecting the relative or absolute position of computer system 1100. Position sensor 1135 can use GPS, assisted-GPS, GSM localization, or similar technologies. Additionally, computer system 1100 can include a motion sensor 1150 that detects the motion of computer system 1100. Motion sensor 1150 can also sense when the computer system 1100 has stopped moving. Motion sensor 1150 can be comprised of one or more electronic gyroscopes or accelerometers.

Computer system 1100 can include network interface 1130. Network interface 1130 can be wired or wireless. For example, network interface 1130 can be comprised of one or more radios for making one or more simultaneous networking connections. Network interface 1130 can use Ethernet, wireless Ethernet including the various 802.11 wireless standards, Bluetooth, cellular and PCS systems, or satellite communication. Network interface 1130 can be used separately or in conjunction with proximity sensor 1145 to detect the proximity of a compatible computer system. In some implementations, network interface 1130 can be used in place of proximity sensor 1145.

Media, user input, metadata, other input or any portion or combination thereof, can be processed in the computer system 1100 using the processor 1120. Processor 1120 can be used to perform analysis, processing, editing, playback functions, or combine various signals, including adding metadata to audio and image signals. For example, processor 1120 can perform facial recognition or insert position information into the image or audio signal. Processor 1120 can use memory 1125 to aid in the processing of various signals. Memory 1125 can be either or both of volatile and non-volatile memory. The original or processed signals can be stored in memory 1125 for processing or stored in storage 1140 for persistent storage. Storage 1140 can be coextensive with memory 1125. Storage 1140 can be either or both of volatile and non-volatile. In some implementations, other types of media also can be shared or manipulated, including audio or video.

FIG. 12 shows an automated sharing event initiated by acute proximity. In another embodiment, two cameras wish to share images in sharing environment 1200. Camera 1205 can be positioned within communication range of camera 1210. When the cameras 1205 and 1210 are in close proximity 1215, the cameras are paired and begin the process of automatically sharing images. Close proximity 1215 can be detected using wireless networking signal strength, position information, movement sensors, or proximity sensors. Close proximity 1215 can also be used as a way of overriding sharing profiles. For instance, cameras 1205 and 1210 can exchange all stored images when in close proximity 1215. Alternatively, a user can be presented with a list of cameras within close proximity 1215 and given the option via a user interface of sharing all images stored on the camera with one or more of the identified cameras. In some implementations, other types of media also can be shared or manipulated, including audio or video.

Figure 13A:
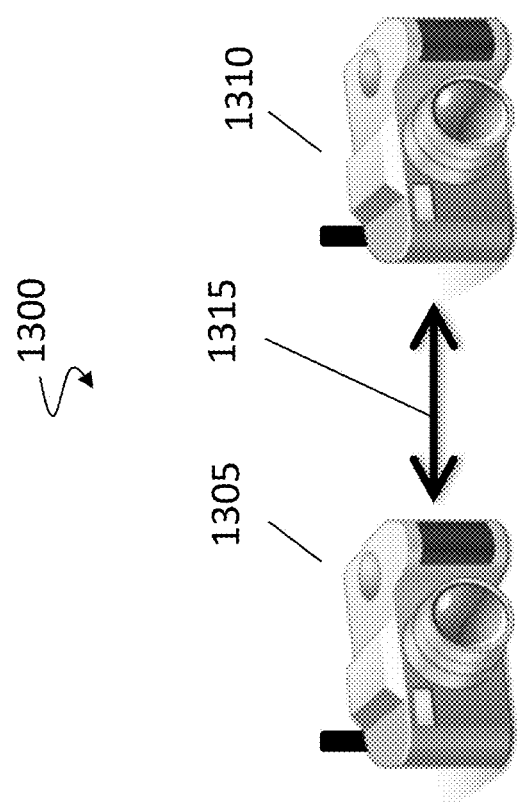
FIG. 13 shows another automated sharing environment that utilizes the Internet.
Figure 13B:
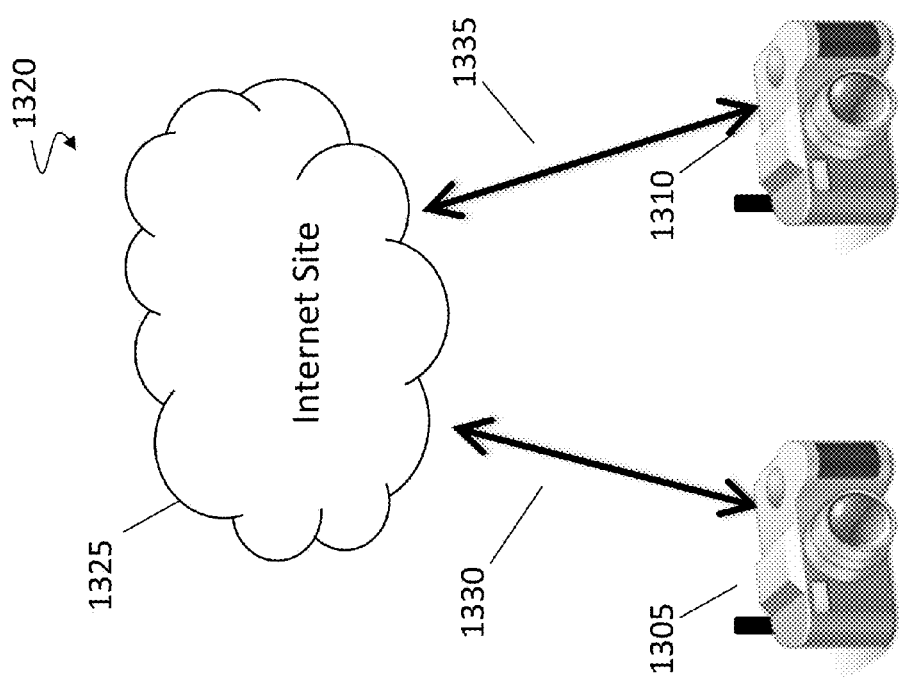

FIG. 13 shows another automated sharing environment that utilizes the Internet. In another embodiment, camera 1305s and 1310 are at an event, such as a party, and within a given proximity of each other. Cameras 1205 and 1210 can identify each other automatically or through user input for sharing images. Cameras 1305 and 1310 can share a unique camera, user, or file identifier 1315. The file identifiers can be filtered based on the cameras' respective send/receive profile as described herein. Cameras 1305 and 1310 also can share or attempt to share media with each other. If either camera 1305 or camera 1310's storage is full, it cannot receive all the images available from the other camera.

In network environment 1320, camera 1310 can connect to Internet site 1325. Camera 1310 can transfer its media 1335 to Internet site 1325. Internet site 1325 can consist of several websites, routers, or servers. Camera 1305 can transfer 1330 the camera, user, or file identifiers it received during sharing event 1300 to Internet site 1325. Camera 1305 can also transfer it's receive profile to Internet site 1325. Internet site 1325 can then use the camera, user, or file identifiers received from camera 1305 to identify the images from camera 1310. Internet site 1325 can compare the available files with camera 1305's receive profile. Internet site 1325 can then transfer 1330 the images corresponding to the camera, user, or file identifiers to camera 1305. The transfers to and from the Internet site 1325 can occur automatically and without user intervention.

Memory cards or laptops, such as those described in FIG. 11, and or computing environments, such as those described in FIG. 4, can also be used to exchange information in network environment 1320. For example a user can remove a memory card from camera 1305, which contains a unique camera, user, or file identifiers from another camera that camera 1305 wishes to receive images from. The user can deposit that memory card into a laptop. The laptop would access the unique camera, user, or file identifiers, search for the corresponding files on Internet 1325 and download them. Similarly, the unique camera, user, or file identifiers can be transferred to the laptop from a camera using a wired or wireless connection. In some implementations, other types of media also can be shared or manipulated, including audio or video.

FIG. 14 shows steps for automatically sharing images using the Internet. A camera can monitor a connection status to determine when a connection has been established (1405). As long as no connection is established, the camera can continue to monitor the connection status (1405). When a transmitting camera wishing to share images establishes a connection, the transmitting camera can transmit file identifiers to a receiving camera (1410), using methods disclosed herein. The receiving camera can store the file identifiers (1415).

At the same time or a later time, the receiving camera can connect to an Internet site (1420). The receiving camera can upload the file identifiers of the images it desires from the transmitting camera to the Internet site (1425). At the same time or a later time, the transmitting camera can connect to the Internet site (1430). The Internet site can request the images corresponding to the file identifiers from the transmit camera (1435). The transmit camera can send the corresponding images to the Internet site (1440). The Internet site can store the images (1445). The Internet site can sends the images to the receiving camera (1450). In some implementations, other types of media also can be shared, including audio or video.

Figure 15:
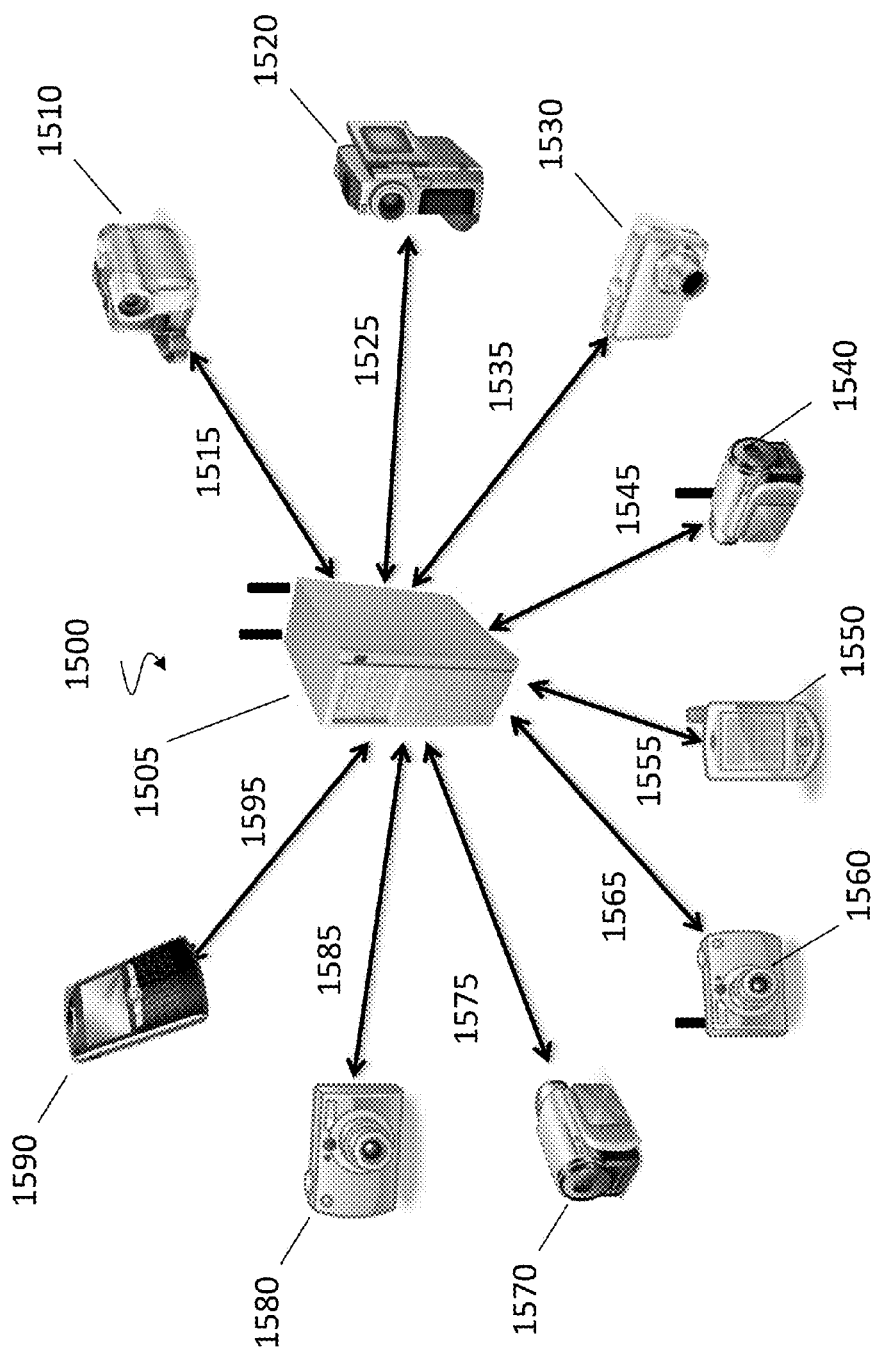
FIG. 15 shows another automated sharing environment involving a multi-device collector.

FIG. 15 shows another automated sharing environment involving a multi-device collector. Sharing environment 1500 shows multiple devices exchanging images with multi-device collector 1505. The multi-device collector can be used at an event like a wedding, where a user wishes to collect all images captured at the wedding.

For instance, camcorder 1510, camcorder 1520, digital camera 1530, digital camcorder 1540, mobile phone 1550, digital camera 1560, camcorder 1570, digital camera 1580, and mobile phone 1590, send images 1515, 1525, 1535, 1545, 1555, 1565, 1575, 1585, and 1595 with multi-device collector 1505.

Multi-device collector 1505 can have multiple networking radios, such that it can simultaneously connect with multiple devices, e.g., multiples of camcorder 1510, camcorder 1520, digital camera 1530, digital camcorder 1540, mobile phone 1550, digital camera 1560, camcorder 1570, digital camera 1580, and mobile phone 1590. The multi-device collector 1505 can establish a file history for each device. Upon each collection, only files not previously received are transferred, or alternatively, all files are transmitted but only the unique files are stored. Also if no connections are available, a device can connect later. FIG. 15 can be compromised of the components described in FIG. 4, including multiple networking connections. In some implementations, other types of media also can be shared or manipulated, including audio or video.

In another embodiment, cameras can have a hot swap button that allows two cameras to exchange all images taken in the last few minutes. The hot swap button can exchange all images taken in the last few minutes with every camera within a given proximity or allow the user to select one or more cameras.

In another embodiment, a camera can track the time and locations where each camera was powered on and/or captured images using a GPS receiver. The camera can have a "time and place" button that allows the camera to set its receive profile to request all images from another camera that approximately overlap with the time and place where the requesting camera was powered on and/or captured images.

In another embodiment, a computer or camera can upload time and place information to an Internet site and the Internet site can identify corresponding photos uploaded from other computers or cameras to share with the computer or camera as describe herein, including FIG. 14.

In another embodiment, cameras can have an "images of me" button that allows a camera to set its receive profile to request all images from another camera that match a face or faces in one or more images of the camera's user or another individual.

In another embodiment, a computer or camera can upload images containing a particular face to an Internet site and the Internet site can identify corresponding photos uploaded from other computers or cameras to share with the computer or camera as describe herein, including FIG. 14.

Some of the implementations disclosed herein have been described in the context of images. In some implementations, other types of media also can be shared or manipulated, including audio or video.

A number of implementations have been disclosed herein. Nevertheless, it will be understood that various modifications can be made without departing from the spirit and scope of the claims. Accordingly, other implementations are within the scope of the following claims.

What is claimed is:

1. An apparatus comprising:
   a digital image sensor capable of capturing a digital image, wherein the captured digital image comprises captured content information including captured image data, and context information including metadata about the capturing of the captured digital image;
   a display capable of displaying both the captured digital image comprised of captured content information including captured image data and context information including metadata about the capturing of the captured digital image;
   a transceiver configured to receive a receive profile; wherein the receive profile comprises media context parameters from another device;
   a digital storage capable of storing a send profile and the captured digital image comprised of captured content information including captured image data and context information including metadata about the capturing of the captured digital image;
   wherein the send profile comprises media context parameters for the current device;
   a processor configured to access the digital storage; process the captured digital image comprised of captured content information including captured image data and context information including metadata about the capturing of the captured digital image; and further configured to identify whether the context information including metadata about the capturing of the captured digital image corresponds to the media context parameters in the send profile and the media context parameters in the receive profile, and provide the identified captured digital image to the transceiver if it corresponds to both the media context parameters in the send profile and the media context parameters in the receive profile;
   wherein the receive profile and the send profile do not contain media content parameters; and
   wherein the transceiver is configured to transmit the provided identified captured image.

2. The apparatus of claim 1, wherein the processor is further configured to present the identified captured image to a user, and only send the identified captured image to the transmitter if the user approves.

3. The apparatus of claim 1, wherein the receive profile also includes an avatar of the user of the another device.

4. The apparatus of claim 1, wherein the processor is further configured to generate a unique identifier for the captured image.

5. The apparatus of claim 1, wherein the send profile includes a resolution threshold.

6. The apparatus of claim 1, wherein the send profile includes a location filter.

7. The apparatus of claim 1, wherein the send profile includes a temporal filter.

8. An apparatus comprising:
- a digital storage adapted to store captured images; wherein the stored images include metadata identifying the times and locations where the stored captured images were taken;
- a transceiver configured to receive a receive profile; wherein the receive profile comprises media context parameters from another device;
- wherein the receive profile includes one or more geographic coordinates and one or more time frames that represent locations and times when the another device captured an image;
- wherein the receive profile does not contain media content parameters;
- a processor configured to access the digital storage adapted to store captured images; compare the receive profile including the one or more geographic coordinates and one or more time frames that represent locations and times when the another device capture the image against the metadata identifying the times and locations where the stored captured photos were taken; select an image from the stored captured images that meets the one or more geographic coordinates and one or more time frames that represent locations and times when the another device captured an image in the receive profile; and provide the selected image to the transceiver
- wherein the transmitter is adapted to transmit the selected image to the receiving device associated with the receive profile.

9. The apparatus of claim 8, wherein the processor is further configured to present the selected image to a user, and only send the selected image to the transmitter if the user approves.

10. The apparatus of claim 8, wherein the receive profile includes a user ID.

11. The apparatus of claim 8, wherein the transceiver is further configured to transmit a send profile.

12. The apparatus of claim 8, wherein the transceiver is further configured to receive an image from an image capture device.

13. The apparatus of claim 8, further comprising a proximity sensor for sensing the proximity of another image storage device.

14. An apparatus comprising:
- an image sensor capable of capturing one or more digital images; wherein the stored images include metadata identifying the times and locations where the captured digital images were taken;
- a digital storage capable of persistently storing the one or more captured digital images including the metadata identifying the times and locations where the captured digital images were taken;
- a display capable of displaying the one or more captured digital images;
- a processor configured to format the one or more captured digital images;
- wherein the processor is further configured to group the one or more captured images into one or more groups based on the metadata identifying the time and place where the one or more captured digital images were taken;
- a user input configured to allow a user to identify a group of captured images representing a time and place where the one or more captured digital images were taken from the one or more groups to send;
- a transceiver configured to receive one or more receive profiles from one or more other devices in proximity, wherein the one or more receive profiles comprises a user ID and an indication the another device is configured to receive photos;
- wherein the user input is further configured to allow the user to select a device to share with from the one or more other devices based on the user ID;
- the transceiver further configured to transmit, in one or more transmissions, a send profile to the selected device and the identified group of captured images to the selected device;
- wherein the send and receive profiles do not contain media content parameters.

15. The apparatus of claim 14, wherein the transceiver is configured to encrypt the transmission of the identified group of captured images.

16. The apparatus of claim 14, wherein the send profile includes thumbnails of the identified group of captured images.

17. The apparatus of claim 14, wherein the send profile includes a user ID.

18. The apparatus of claim 14, wherein the transceiver can make all or some of its transmissions and receptions using Bluetooth, WiFi, or a mix of both.

* * * * *